(12) United States Patent
Grall et al.

(10) Patent No.: US 12,259,077 B2
(45) Date of Patent: Mar. 25, 2025

(54) DEVICE FOR A SEALED PASSAGE OF LONGITUDINAL ELEMENTS THROUGH A PARTITION

(71) Applicant: IXBLUE, Saint-Germain-en-Laye (FR)

(72) Inventors: Sébastien Grall, Saint-Germain-en-Laye (FR); Pierre Lallemand, Saint-Germain-en-Laye (FR); Frédéric Murier, Saint-Germain-en-Laye (FR); Lionel Secco, Saint-Germain-en-Laye (FR)

(73) Assignee: EXAIL, Saint-Germain-enLaye (FR)

( * ) Notice: Subject to any disclaimer, the term of this patent is extended or adjusted under 35 U.S.C. 154(b) by 25 days.

(21) Appl. No.: 17/790,387

(22) PCT Filed: Dec. 30, 2020

(86) PCT No.: PCT/EP2020/088031
§ 371 (c)(1),
(2) Date: Jun. 30, 2022

(87) PCT Pub. No.: WO2021/136806
PCT Pub. Date: Jul. 8, 2021

(65) Prior Publication Data
US 2023/0042371 A1    Feb. 9, 2023

(30) Foreign Application Priority Data
Dec. 30, 2019   (FR) .................................... 1915731

(51) Int. Cl.
*F16L 5/10*    (2006.01)
*F16L 5/14*    (2006.01)
*H02G 3/22*    (2006.01)

(52) U.S. Cl.
CPC .................. *F16L 5/10* (2013.01); *F16L 5/14* (2013.01); *H02G 3/22* (2013.01)

(58) Field of Classification Search
CPC ................. F16L 5/10; F16L 5/14; H02G 3/22
See application file for complete search history.

(56) References Cited

U.S. PATENT DOCUMENTS

| | | | |
|---|---|---|---|
| 8,502,090 B2 * | 8/2013 | Winship | H02G 3/22 174/72 A |
| 8,581,120 B2 * | 11/2013 | Winship | H02G 15/013 439/271 |
| 2011/0226084 A1 * | 9/2011 | Chiou | F16C 1/102 74/502.4 |

FOREIGN PATENT DOCUMENTS

| | | |
|---|---|---|
| EP | 0 967 425 | 12/1999 |
| EP | 1 236 943 | 9/2002 |
| EP | 1 279 877 | 1/2003 |

OTHER PUBLICATIONS

International Search Report dated Mar. 25, 2021, for PCT/EP2020/088031, 6 pp., including English translation.

(Continued)

*Primary Examiner* — Gilbert Y Lee
(74) *Attorney, Agent, or Firm* — NIXON & VANDERHYE

(57) ABSTRACT

Disclosed is a device for the sealed passage of at least one longitudinal element through a through-hole provided in a partition, including—a frame capable of being permanently fastened in a sealed manner on the partition in order to delimit the hole,—a removable insert, of which at least a central portion is produced by moulding on the longitudinal element in order to produce a sealed connection with the latter, the removable insert being configured to be inserted in a removable and sealed manner in the frame.

15 Claims, 5 Drawing Sheets

(56) References Cited

OTHER PUBLICATIONS

Figure 1:
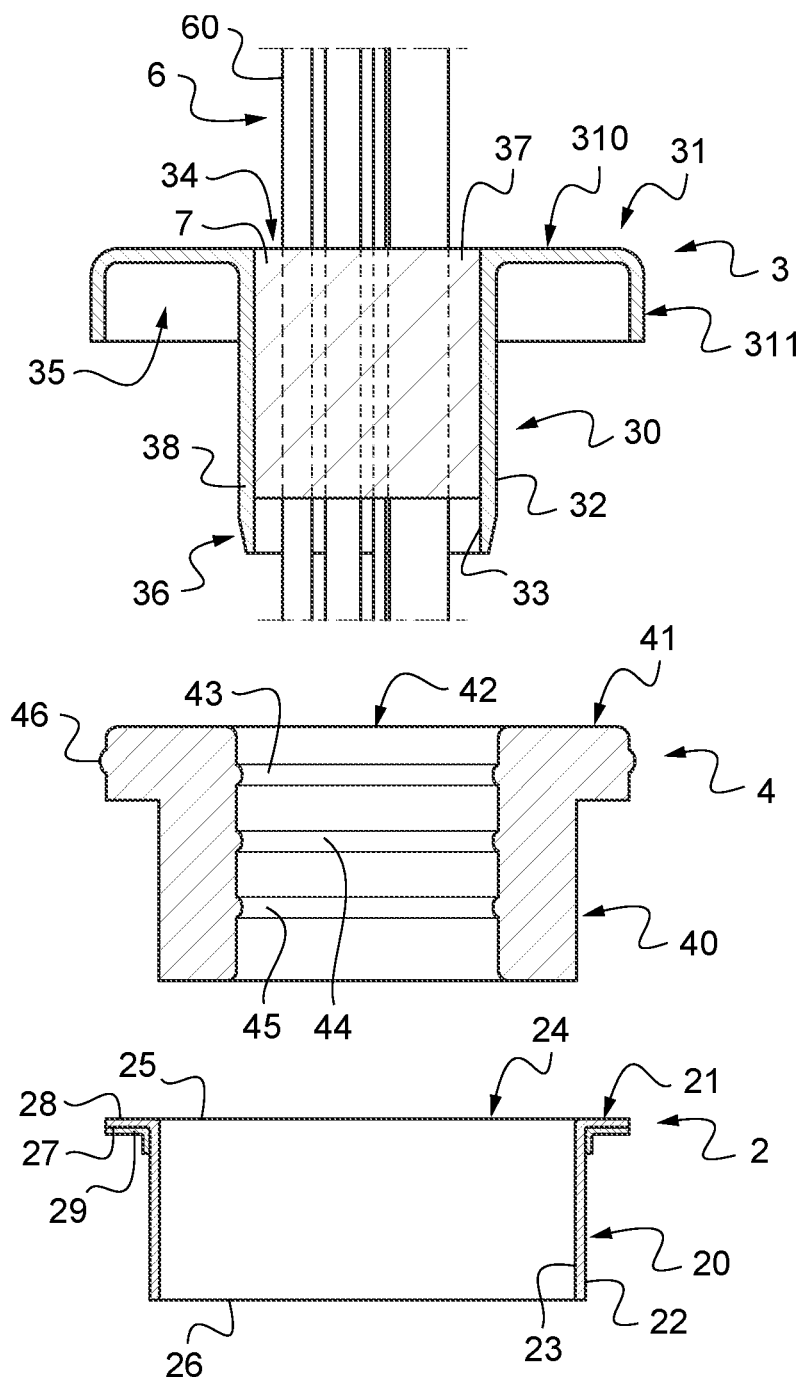

Written Opinion of the International Searching Authority dated Mar. 25, 2021, for PCT/EP2020/088031, 6 pp.

* cited by examiner

DEVICE FOR A SEALED PASSAGE OF LONGITUDINAL ELEMENTS THROUGH A PARTITION

This application is the U.S. national phase of International Application No. PCT/EP2020/088031 filed Dec. 30, 2020, which designated the U.S. and claims priority to FR 1915731 filed Dec. 30, 2019, the entire contents of each of which are hereby incorporated by reference.

The invention relates to the field of construction, in particular light work, and finds a particular application in the maritime field. More precisely, the invention relates to a sealed device for the passage of longitudinal elements such as cables and/or pipes through a partition.

In the above-mentioned field, it is known, for passing cables or pipes through a partition, to make a through-hole in the partition and to fasten a frame thereto, for example a ring, in such a way that the ring delimits the hole, and to pass the cables and pipes through the partition by making them pass through the frame. This type of installation is usually referred to by the person skilled in the art as "cable grommet", "wire grommet", "cable gland" or, in the maritime field, as "coaming".

During the making of a cable grommet, it is sometimes necessary to maintain the tightness of the partition. This is in particular the case in the maritime field in which the partitions delimiting compartments are liable to be immersed and must hence be liquid-tight, but also in other fields in which gas-tightness may be required.

In order to achieve this objective, a solution consists in filling the whole volume of the hole delimited by the frame about the cables by pouring a sealing material, for example mastic or resin.

Although this solution ensures a satisfying tightness, it has for drawback not to be removable. Indeed, in order to remove or add a cable through the partition, it is necessary to remove, or at least damage, the sealing material, then to proceed to a new pouring once the operation finished. Given that, traditionally, the frame is permanently fastened to the partition, this operation is tedious.

Another solution consists in equipping the inner wall of the frame with a retractable membrane controlled by a clamping device and to operate the clamping device in such a way that the membrane squeezes the cables and ensures that way the cable grommet tightness.

That being said, although this solution allows adding or removing cables without damaging the cable grommet, it does not provide sufficient tightness and thus does not suit to maritime applications and/or to ensure gas-tightness.

There thus exists a need for a cable grommet having both sufficient tightness and flexibility of use making it possible to easily and rapidly add and remove cables.

Therefore, in one aspect, it is proposed a device for the sealed passage of at least one longitudinal element through a through-hole provided in a partition, comprising:
  a frame capable of being fastened in a permanent and sealed manner on the partition in order to delimit said hole,
  a removable insert, at least a central portion of which is made by moulding on said longitudinal element in order to produce a sealed connection with the latter, the removable insert being configured to be inserted in a removable and sealed manner into said frame.

It is hence advantageously possible to easily separate the removable insert, which here acts as a cable grommet as such, from the frame, and hence to add and remove longitudinal elements in simple way, in particular at a distance from the partition. Moreover, the central portion closely conforming the longitudinal element ensures a good seal between these two elements.

A moulding process advantageously allows ensuring that all the space that is not occupied by the longitudinal element is occupied by the sealing material. Moreover, thanks to moulding, the removable insert suits to longitudinal elements of any shape, in particular longitudinal elements with an irregular cross-section.

The central portion made by moulding especially suits to non-rectilinear longitudinal elements. For example, the removable portion made by moulding suits to longitudinal elements folded over themselves, that is to say forming loops or knots, as well as interleaved longitudinal elements, for example braided elements. This contributes to improve the device tightness regardless the shape and arrangement of the longitudinal elements.

Finally, a moulding process allows a better adhesion between the longitudinal elements and the removable insert, which contributes to improve the device tightness.

The removable insert may comprise a tubular portion that surrounds the central portion and in which the central portion is moulded, the tubular portion remaining permanently around the central portion after moulding of the central portion and forming a sealed connection with the frame when the removable insert is inserted.

Using a removable insert provided with a partition advantageously eliminates the need to use a temporary mould to make the central portion. This simplifies the use of the device.

The removable insert may comprise an insert collar forming a stop to limit the insertion travel of the removable insert into the hole.

The insert collar may comprise an extension of said tubular part.

The frame may comprise a frame collar adapted to come into abutment against said partition.

The frame collar advantageously allows a better fastening of the frame to the partition by avoiding that the latter slides into the through-hole, and allows in particular improving the seal between the frame and the partition.

According to one embodiment, the device comprises at least one spacer ring arranged between the frame and the removable insert, configured to ensure the seal between the sleeve and the removable insert.

The spacer ring may be made of an elastomeric material.

The spacer ring advantageously allows improving the seal between the frame and the removable insert. Moreover, the spacer ring allows a good adhesion between the frame and the removable insert.

The spacer ring may comprise at least one O-ring.

An O-ring is a simple and cheap means for ensuring the tightness of the device.

The frame and/or the removable insert may comprise at least one annular groove, the O-ring being configured to be inserted into said at least one annular groove.

This advantageously simplifies device handling by ensuring that the O-ring is held in place during installation or removing of the removable insert.

The spacer ring may comprise a spacer collar adapted to come into abutment against said frame.

The spacer collar advantageously improves the tightness of the device. Moreover, the spacer collar advantageously forms a protrusion extending beyond the partition surface. This facilitates the spacer ring handling and hence the device installation and removal. Moreover, the presence of a protrusion extending beyond the partition surface is particularly advantageous because it allows holding the longitudinal element out of water in the case where the partition is an immersed horizontal partition.

The insert collar may form a cap covering the spacer collar.

Therefore, the tightness of the device is improved and the spacer collar is protected from the outside environment. Moreover, the collar here forms a protrusion extending beyond the partition surface and facilitates the removable insert installation and removal, and thus the device handling. Moreover, the presence of a protrusion extending beyond the partition surface is particularly advantageous because it allows holding the longitudinal element out of water in the case where the partition is an immersed horizontal partition.

The different features, alternatives and embodiments of the invention can be associated with each other according to various combinations, insofar as they are not incompatible or exclusive with respect to each other.

Figure 2:
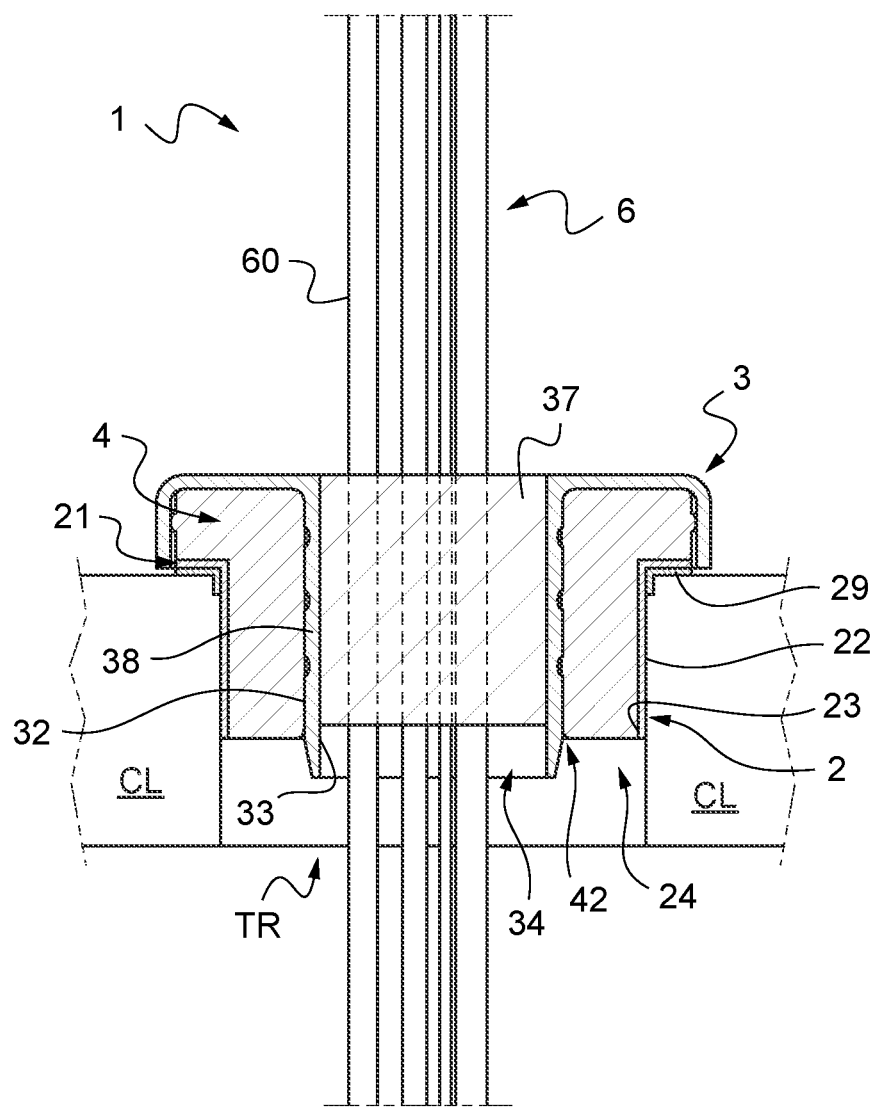
Figure 3:
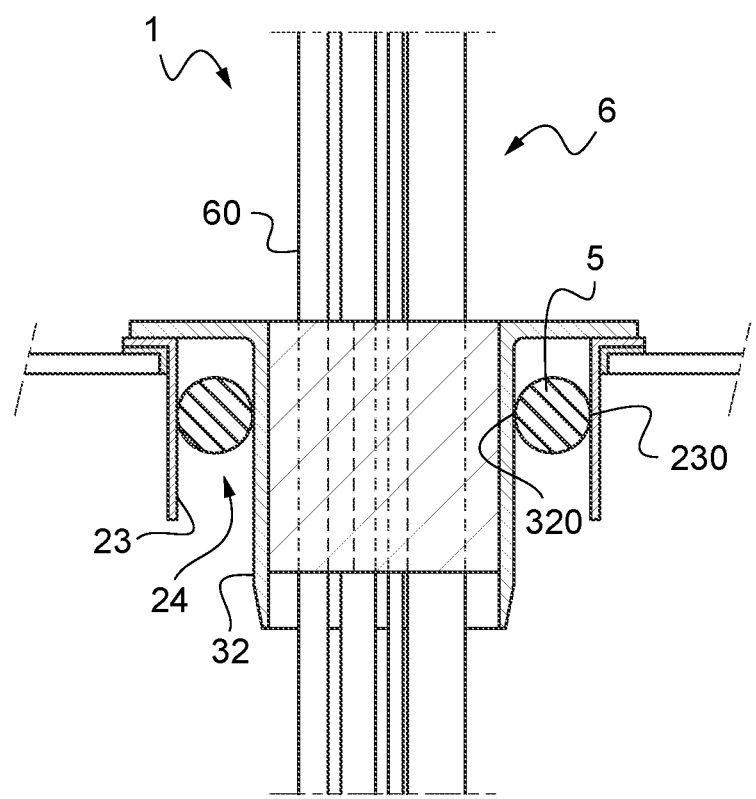
Figure 4:
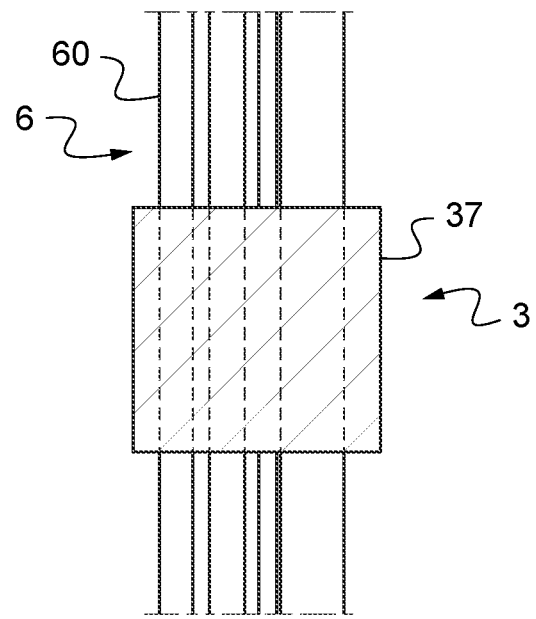
Figure 5:
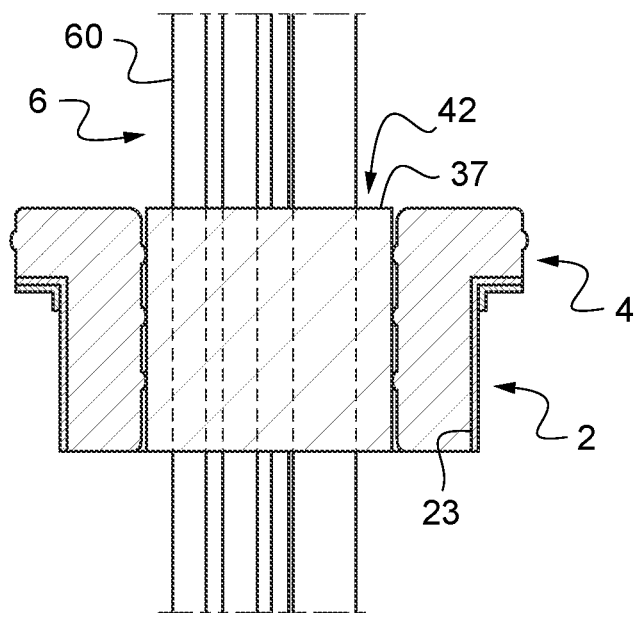
Figure 6:
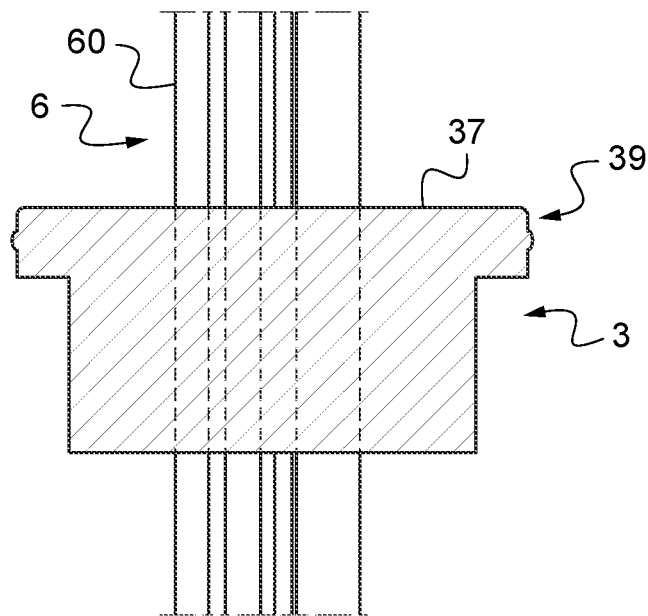
Figure 7:
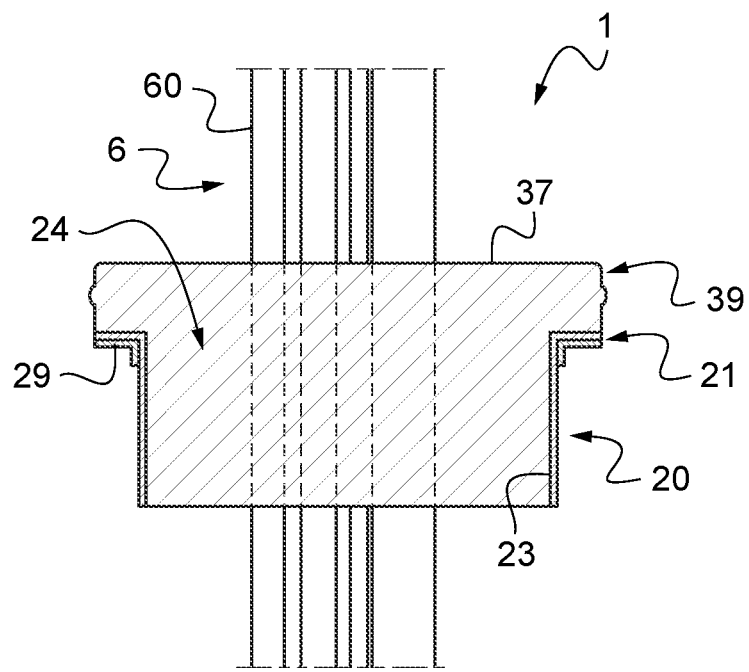

Other advantages and features of the invention will become apparent from the detailed description of embodiments of the invention, which is not limiting, and from the attached drawings in which FIG. 1 is a cross-sectional view of a device according to an embodiment of the invention, the various elements of the device being separated from each other, FIG. 2 is a cross-sectional view of the device of FIG. 1, the various elements of the device being assembled to each other in a sealed manner, FIG. 3 is a cross-sectional view of a device according to another embodiment of the invention, including an O-ring, FIG. 4 is a cross-sectional view of a removable insert of a device according to another embodiment of the invention, FIG. 5 is a cross-sectional view of a device according to an embodiment of the invention, including the removable insert of FIG. 4, FIG. 6 is a cross-sectional view of a removable insert of a device according to another embodiment of the invention, FIG. 7 is a cross-sectional view of a device according to an embodiment of the invention, including the removable insert of FIG. 6.

It is to be noted that, in these figures, the structural and/or functional elements common to the different alternatives can have the same references numbers.

FIG. 1 is an exploded cross-sectional view of a device 1 according to an embodiment of the invention. The device 1 is configured to allow the sealed passage of longitudinal elements, here a bundle 6 of longitudinal elements. For example, here, the longitudinal elements are electrical wires, i.e. wires made of an electrically conductive material, here copper, surrounded by an electrically insulating sheath, here a plastic material. For the sake of simplification, a single electrical wire 60 is indicated in the Figures.

The device 1 comprises three distinct elements configured to be assembled to each other in a sealed manner, here a frame 2, a removable insert 3 and a spacer ring 4 ensuring a sealed connection between the frame 2 and the removable insert 3. In FIG. 1, the frame 2, the removable insert 3 and the spacer ring 4 are separated from each other.

FIG. 2 shows the same device 1 in which the frame 2, the removable insert 3 and the sealing element 4 are assembled to each other. The frame is introduced in a sealed manner into a through-hole TR of a partition CL, here a hole of circular cross-section, in order to delimit the hole TR. For example, here, the partition CL is a partition separating the separating the cabin of a boat from the outside.

The frame 2 is here a metal frame, for example here stainless steel. The frame 2 could however be made of any other sealing and water-resistant material, such as for example a plastic material.

The frame 2 has a wholly cylindrical ring shape. It has a first cylindrical body 20 extended by a frame collar 21 and has a first outer wall 22 and a first inner wall 23. The first internal wall 23 delimits the hole TR and defines a first passage 24 in the frame. Here, the first passage 24 has a cylinder shape, and in particular in this example a revolution cylinder shape. It hence extends here between a first circular aperture 25 and a second circular aperture 26. As an alternative, the first passage 24 could have any other cylindrical shape.

A cylinder is understood here as a solid generated by a line segment, called the generating line, which moves parallel to an axis between two fixed parallel planes called bases of the cylinder. Thus a cylinder can have discoidal bases, ellipsoidal bases or bases of any shape. A cylinder may be a prism, that is to say it may have polygonal bases. A cylinder whose bases are perpendicular to the generating line is a right cylinder.

Here, the first passage 24 has a circular cross-section whose diameter is 54 millimetres and extends longitudinally over a length of 47 millimetres. As an alternative, the first passage 24 could have any other diameter and/or any other length.

The frame collar 21 is made at the first aperture 25 and is formed by a first outer shoulder 27 of the first outer wall 20 and by a first inner shoulder 28 of the first inner wall 21.

The frame 2 is configured to be inserted into the hole TR of the partition CL, by passing the first body 20 into said hole TR of the partition CL in such a way that, as illustrated in FIG. 2, the first collar 21 comes into abutment against the partition CL. In this example, a lip seal 29 is placed at the first outer shoulder 27 and allows reinforcing the seal between the frame 2 and the partition CL. As an alternative, it would be possible that the frame is devoid of lip seal and bonded to the partition by means an adhesive material. This advantageously allows maintaining a good tightness whatever the quality of surface of the partition CL and/or of the hole TR.

The spacer ring 4 is here made of natural rubber, but could be made of any other elastic sealing material, for example mastic or resin. For example, here, the spacer ring has been made by moulding and is hence consisted of a single piece of material.

The spacer ring 4 comprises a spacer body 40. The spacer body 40 has a shape that is complementary of that of the first passage 24 and is configured to be inserted coaxially into the first passage 24. For example, here, the spacer ring 4 has a generally cylindrical shape and the spacer body 40 is a revolution cylinder.

Here, the spacer body 40 is extended by a spacer collar 41. The spacer collar here has a height, that is to say a dimension taken in the longitudinal direction, equal to 19 millimetres and a diameter equal to 68 millimetres. The spacer body 40 of the spacer ring 4 has here a diameter slightly greater than the diameter of the first passage 24, here a diameter of 54.5 millimetres. As an alternative, the spacer ring 4 could be devoid of collar.

As illustrated in FIG. 2, the spacer element 4 is configured to be inserted into the first passage 24 by passing the spacer body 40 through the first aperture 25 in such a way that the spacer collar 41 comes into abutment against the frame collar 21. Therefore, the spacer body 40 covers the first inner wall 23 in the first passage 24 and the dimensions of the spacer body 40 and the first passage 24 are such that, when the spacer ring 4 is inserted into the first passage 24, it deforms and exerts a pressure through elasticity on the first inner wall 23. In other words, the spacer ring 4 is press-fitted into the first passage 24.

This pressure force ensures that the spacer ring 4 is applied against the first inner wall 23 and thus that the seal between the spacer ring 4 and the first inner wall 23 is ensured. Moreover, this pressure force ensures that the spacer ring 4 is maintained in the first passage 24 thanks to the forces of friction between the spacer body 40 and the first inner wall 23, instead of exerting on the spacer ring a high tensile force in the longitudinal direction for removing it from the first passage 24, for example a force exerted by an adult male pulling on the spacer ring 4 with one hand; such a force may for example be of 150 Newton.

As an alternative, in order to ensure the holding of the spacer ring in the first passage 24, the spacer ring 5 can be bonded to the first inner wall 23 of the frame 2 by means an adhesive material. In this alternative, the spacer ring could have a diameter equal to the diameter of the first passage. This alternative is particularly advantageous when the device is immersed for an extended duration, because it has in this case a better seal. The first inner wall 23 could comprise at least one circular groove surrounding the first passage 24 and in which a corresponding circular protrusion of the spacer ring 4 could be received.

The spacer ring 4 comprises a space passage 42 having a shape that is complementary of that of the first passage 24, that is to say here a circular cylindrical shape that, when the spacer ring 4 is inserted into the first passage 24, is coaxial to the first passage 24. Here, the diameter of the spacer passage 42 is equal to 34 millimetres.

The removable insert 3 comprises a central portion 37 here surrounded by a tubular portion 38.

The central portion 37 here comprises an elastomeric material, here rubber, closely conforming the tubular portion 38 and the electrical wires of the bundle 6. Here, the central portion 37 is moulded in the tubular portion 38 around the electrical wires of the bundle 6.

The tubular portion 38 is here a metal partition, for example here made of stainless steel. The tubular portion 38 could however be made of any other sealing and water-resistant material, such as for example a plastic material. In particular, the tubular portion 38 and the frame 2 could be made of different materials.

The tubular portion 38 defines a second, cylindrical body 30 comprising a second outer wall 32 and a second inner wall 33. The second inner wall 33 defines a second passage 34. Here, the second passage 34 has a revolution cylinder shape but could have any other shape.

The second body 30 has a shape that is complementary of that of the first passage 24 and the space passage 42, here a revolution cylinder shape. Here, the second body 30 has an outer diameter lower than that of the first passage 24 and slightly higher than that of the spacer passage 42, that is to say an outer diameter equal to 34.5 millimetres.

Thus, as illustrated in FIG. 2, when the removable insert 3 is inserted into the spacer passage 42, coaxially to said spacer passage 42, the spacer ring 4 is compressed between the first inner wall 23 and the second outer wall 32 and exerts a force on these two walls by elasticity, in such a way as to ensure the seal between the removable insert 3 and the spacer ring 4, on the one hand, and between the spacer ring 4 and the frame 2, on the other hand.

As an alternative, it would be possible that the spacer passage 42 and the second body 30 have shapes that are complementary but different from that of the first passage 24, for example prismatic shapes. Complementary shapes allow a better homogeneity of the elastic forces exerted by the spacer ring 4 on the removable insert 3 and on the frame 2, and thus a better seal of the device 1.

In the embodiment illustrated, the spacer ring comprises three circular protrusions 43, 44, 45 surrounding the spacer passage 42. These three protrusions allow the making of three annular pressure areas on the removable insert 3, which contributes to the good tightness of the connection between the removable insert 3 and the spacer ring 4. As an alternative, the spacer ring could comprise a different number of circular protrusions or have no circular protrusion.

In this embodiment, the second body 30 is extended by an insert collar 31, formed by an extension of the tubular portion 38 at a first end of the second body 30.

The insert collar 31 comprises a first proximal portion 310 extending radially towards the outside of the removable insert 3 from the second body 30 and a distal portion 311 extending from the proximal portion 310 along the second body 30, coaxially to the second body 30. In other words, the insert collar 31 is curved in such a way as to form an annular cavity 35 coaxial to the second body 30. Here, the height of the annular cavity 35, i.e. the dimension of the distal portion 311 of the insert collar 31 taken in the longitudinal direction, is equal to the height of the spacer collar 41, i.e. here 19 millimetres.

And the maximum diameter of the annular cavity 35, i.e. the diameter of the annular cavity 35 taken at the distal portion 311, is here slightly lower than the diameter of the spacer collar 41, i.e. here 67,5 millimetres. As an alternative, it would be possible that the height of the annular cavity 35 is lower than the height of the spacer collar 41 and/or that the maximum diameter of the annular cavity 35 is equal to or higher than the diameter of the spacer collar 41.

Thus, in the illustrated example, when the removable insert 3 is inserted coaxially into the spacer passage 42, the insert collar 31 covers and radially compresses the spacer collar 41 between the second body 30 and the distal portion 311. In other words, the insert collar 31 here forms a cap covering the spacer collar 41. The space collar 41 exerts radial forces on the second outer wall 32 by elasticity.

In the embodiment illustrated, the spacer ring comprises a circular protrusion 46 surrounding the spacer passage 41. This protrusion allows the making of an annular pressure area on the wall of the annular cavity 35, which contributes to the good tightness of the connection between the removable insert 3 and the spacer ring 4. As an alternative, the spacer ring 4 could comprise a different number of circular protrusions or have no circular protrusion.

Moreover, the insert collar 31 acts as a stop to limit the insertion travel of the removable insert 3 into the hole TR. In this example, the second outer wall 32 at the proximal portion 310 comes into abutment against the spacer ring 4, but it would be possible, in the case where the height of the annular cavity 35 is greater than the height of the spacer collar 41, that the distal portion 311 comes into abutment against the frame collar 21 or directly against the partition CL.

As an alternative, it would be possible that the insert collar 31 comprises only the proximal portion 310, that is to say that the insert collar 31 could be simply formed by a second outer stop of the second outer wall 32, and would thus not define an annular cavity.

In the example illustrated here, a second end of the second body 30, opposite the first end of the second body 30, that is to say opposite the end from which the second collar 31 extends, comprises a chamfer 36 allowing an easier insertion of the removable insert 3 into the first passage 24 and more precisely here in the spacer passage 42.

So, when it is necessary to accede to the hole TR, it is advantageously possible to remove the removable insert 3 from the first passage 24 without degrading the device and manually, i.e. without using a tool.

Potentially, in order to remove or add one or several electrical wires in the bundle 6, it is possible to remove the central portion and to pass the new wire through the second passage 34 and the first passage 24, that is to say here also through the spacer passage 42 of the spacer ring that remained in place. To reform the central portion, it is possible to pour again a sealing material into the second passage 42 and to replace the removable insert 3. Thus, the new removable insert fits perfectly to the new bundle.

As an alternative, the device 1 could also be configured in such a way that the friction or adhesion forces between the spacer ring and the second outer wall 32 are higher than the friction or adhesion forces between the spacer ring 4 and the first inner wall 23. In this case, the spacer ring would remain attached to the removable insert during removal of the removable insert.

In an alternative embodiment, the spacer ring could take the form of an O-ring. Thus, as illustrated in FIG. 3, the spacer ring here comprises an O-ring 5 compressed between the first inner wall 23 and the second outer wall 32.

For example, here, the first inner wall 23 comprises a first annular groove 230 surrounding the first passage 24 and wherein the O-ring is received, and the second outer wall 32 comprises a corresponding second annular groove 320 into which the O-ring 8 is received.

As an alternative, it would be possible that the first inner wall 23 does not contain the first annular groove 230 and/or that the second outer wall 32 does not contain the second annular groove 320.

Moreover, it would be quite possible that the device 1 comprises a plurality of O-rings, for example three O-rings, and that the removable insert 3 and/or the frame 2 comprise a plurality of corresponding annular rings.

According to an alternative embodiment, it would be possible, as illustrated in FIG. 4, that the removable insert 3 comprises only the central portion 37 and is devoid of the tubular portion described hereinabove.

According to this alternative embodiment, the removable insert is made by moulding of the central portion of the wires of the bundle 6, in a temporary cylindrical mould (not shown) removed after moulding of the removable insert 3. Here, the central portion 37 has a diameter slightly greater than the diameter of the spacer passage 42, here a diameter of 34.5 millimetres.

Thus, as illustrated in FIG. 5, when the removable insert 3 is inserted into the spacer passage 42, coaxially to said spacer passage 42, the spacer ring 4 is compressed between the first inner wall 23 and the central wall 37 and ensures by elasticity the seal between the removable insert 3 and the spacer ring 4, on the one hand, and between the spacer ring 4 and the frame 2, on the other hand.

Another embodiment is illustrated in FIGS. 6 and 7.

As illustrated in FIG. 6, the insert collar comprises a shoulder 39 of the central portion made during the moulding of the central portion 37. According to this embodiment, the removable insert 3 does not comprise the tubular portion described hereinabove.

As illustrated in FIG. 7, the device 1 is devoid of spacer ring and, when the removable insert 3 is inserted into the first passage 24, coaxially to the first passage 24, the removable insert 3 is compressed in the first passage 24 and exerts on the first inner wall 23 a force by elasticity in order to ensure the seal between the first inner wall 23 and the removable insert 3. Here, the shoulder 39 advantageously limits the depth of insertion of the removable insert 3 into the first passage 24 by coming into abutment against the frame collar 21. Moreover, the shoulder 39 contributes to the tightness of the device 1.

Various other modifications may be made to the invention within the scope of the appended claims.

The invention claimed is:

1. A device for the sealed passage of at least one longitudinal element (60) through a through-hole provided in a partition, comprising:
   the longitudinal element,
   a frame capable of being fastened in a permanent and sealed manner on the partition in order to delimit said hole,
   a removable insert, at least a central portion of which is made by moulding on said longitudinal element in order to produce a sealed connection with the longitudinal element, the removable insert being configured to be inserted in a removable and sealed manner into said frame, the removable insert comprising a tubular portion that surrounds the central portion and in which the central portion is moulded, the tubular portion remaining permanently around the central portion after moulding of the central portion and forming a sealed connection with the frame when the removable insert is inserted,
   at least a spacer ring arranged between the frame and the removable insert and directly in contact with the frame and the removable insert, configured to ensure the seal between the frame and the removable insert and including a spacer collar adapted to come into abutment against said frame.

2. The device according to claim 1, wherein the removable insert comprises an insert collar forming a stop to limit the insertion travel of the removable insert into the hole.

3. The device according to claim 2, wherein the insert collar comprises an extension of said tubular part.

4. The device according to claim 3, wherein the insert collar forms a cap configured to cover the spacer collar.

5. The device according to claim 3, wherein the frame comprises a frame collar adapted to come into abutment against said partition.

6. The device according to claim 5, wherein the spacer ring is made of an elastomeric material.

7. The device according to claim 5, wherein the insert collar forms a cap configured to cover the spacer collar.

8. The device according to claim 3, wherein the spacer ring is made of an elastomeric material.

9. The device according to claim 8, wherein the insert collar forms a cap configured to cover the spacer collar.

10. The device according to any claim 2, wherein the frame comprises a frame collar adapted to come into abutment against said partition.

11. The device according to claim 10, wherein the spacer ring is made of an elastomeric material.

12. The device according to claim 2, wherein the spacer ring is made of an elastomeric material.

13. The device according to claim 1, wherein the frame comprises a frame collar adapted to come into abutment against said partition.

14. The device according to claim 13, wherein the spacer ring is made of an elastomeric material.

15. The device according to claim 1, wherein the spacer ring is made of an elastomeric material.

\* \* \* \* \*